US011296611B2

(12) United States Patent
Chen et al.

(10) Patent No.: US 11,296,611 B2
(45) Date of Patent: Apr. 5, 2022

(54) CONTROL CIRCUIT, CONTROL METHOD AND RESONANT CONVERTER

(71) Applicant: Silergy Semiconductor Technology (Hangzhou) LTD, Hangzhou (CN)

(72) Inventors: Chaojun Chen, Hangzhou (CN); Jian Deng, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 17/104,268

(22) Filed: Nov. 25, 2020

(65) Prior Publication Data

US 2021/0184588 A1  Jun. 17, 2021

(30) Foreign Application Priority Data

Dec. 11, 2019  (CN) .......................... 201911267788.1

(51) Int. Cl.
*H02M 3/335* (2006.01)
*H02M 1/088* (2006.01)

(52) U.S. Cl.
CPC ....... *H02M 3/33592* (2013.01); *H02M 1/088* (2013.01); *H02M 3/33573* (2021.05)

(58) Field of Classification Search
CPC ............ H02M 3/33592; H02M 1/088; H02M 3/33573; H02M 1/0038; H02M 1/0032; H02M 3/01; H02M 1/0041; Y02B 70/10
See application file for complete search history.

(56) References Cited

U.S. PATENT DOCUMENTS

| 6,005,780 | A | 12/1999 | Hua |
| 6,580,258 | B2 | 6/2003 | Wilcox et al. |
| 9,325,254 | B2 | 4/2016 | Deng et al. |
| 9,331,588 | B2 | 5/2016 | Chen |
| 9,488,680 | B2 | 11/2016 | Xu |
| 9,608,532 | B2* | 3/2017 | Wong ................... H02M 3/1588 |
| 2009/0244934 | A1* | 10/2009 | Wang ................. H02M 3/33592 363/21.06 |
| 2014/0078788 | A1* | 3/2014 | Yao ..................... H02M 3/33523 363/21.14 |
| 2014/0078789 | A1 | 3/2014 | Li et al. |
| 2014/0239934 | A1 | 8/2014 | Zhang |
| 2015/0049521 | A1* | 2/2015 | Iorio ................. H02M 3/33592 363/21.02 |
| 2015/0160270 | A1 | 6/2015 | Shi et al. |
| 2015/0214829 | A1* | 7/2015 | Xu ........................ G01R 19/175 363/21.03 |
| 2015/0280578 | A1 | 10/2015 | Huang et al. |
| 2016/0276945 | A1* | 9/2016 | Yan ...................... H02M 3/1588 |
| 2016/0294298 | A1* | 10/2016 | Wong ...................... H02M 1/38 |

(Continued)

FOREIGN PATENT DOCUMENTS

CN  102231605 A  11/2011

*Primary Examiner* — Yusef A Ahmed

(57) ABSTRACT

A control circuit for controlling a synchronous rectification switch of a resonant converter, where in a switching cycle, the control circuit is configured to: delay a first time period from a first moment; control the synchronous rectification switch to be turned on when a drain-source voltage of the synchronous rectification switch reaches a first threshold after the first time period; and where the first time period is generated based on an operating state of the synchronous rectification switch in a previous switching cycle.

16 Claims, 8 Drawing Sheets

(56) References Cited

U.S. PATENT DOCUMENTS

| | | | | |
|---|---|---|---|---|
| 2017/0063246 A1* | 3/2017 | Kong | ............... | H02M 3/33592 |
| 2017/0244332 A1* | 8/2017 | Leong | ............... | H02M 3/33523 |
| 2017/0353099 A1* | 12/2017 | Yang | ................. | H02M 7/1557 |
| 2018/0212527 A1* | 7/2018 | Kong | ..................... | H02M 1/08 |
| 2019/0165686 A1* | 5/2019 | Wang | ............... | H02M 3/33592 |
| 2019/0222131 A1* | 7/2019 | King | ................. | H02M 3/33592 |
| 2019/0267906 A1* | 8/2019 | Zhang | ................... | H02M 1/083 |
| 2020/0204080 A1* | 6/2020 | Zhang | ................. | H02M 3/1588 |
| 2020/0313563 A1* | 10/2020 | Hyugaji | ............ | H02M 3/33592 |
| 2021/0006172 A1* | 1/2021 | Hu | .................. | H02M 3/33592 |
| 2021/0067026 A1* | 3/2021 | Tsai | ................. | H02M 3/33592 |
| 2021/0126543 A1* | 4/2021 | Chang | ............... | H02M 3/33592 |
| 2021/0143725 A1* | 5/2021 | Deng | ................. | H02M 1/0048 |
| 2021/0143743 A1* | 5/2021 | Deng | ............... | H02M 3/33592 |
| 2021/0167680 A1* | 6/2021 | Odell | ..................... | H02M 1/34 |
| 2021/0175817 A1* | 6/2021 | Miao | ................. | H02M 3/33592 |
| 2021/0194378 A1* | 6/2021 | Tian | ................. | H02M 3/33592 |
| 2021/0281184 A1* | 9/2021 | Radic | ................. | H02M 3/1588 |

* cited by examiner

CONTROL CIRCUIT, CONTROL METHOD AND RESONANT CONVERTER

RELATED APPLICATIONS

This application claims the benefit of Chinese Patent Application No. 201911267788.1, filed on Dec. 11, 2019, which is incorporated herein by reference in its entirety.

FIELD OF THE INVENTION

The present invention generally relates to the field of power electronics, and more particularly to control circuits and methods, and associated resonant converters.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Figure 1:
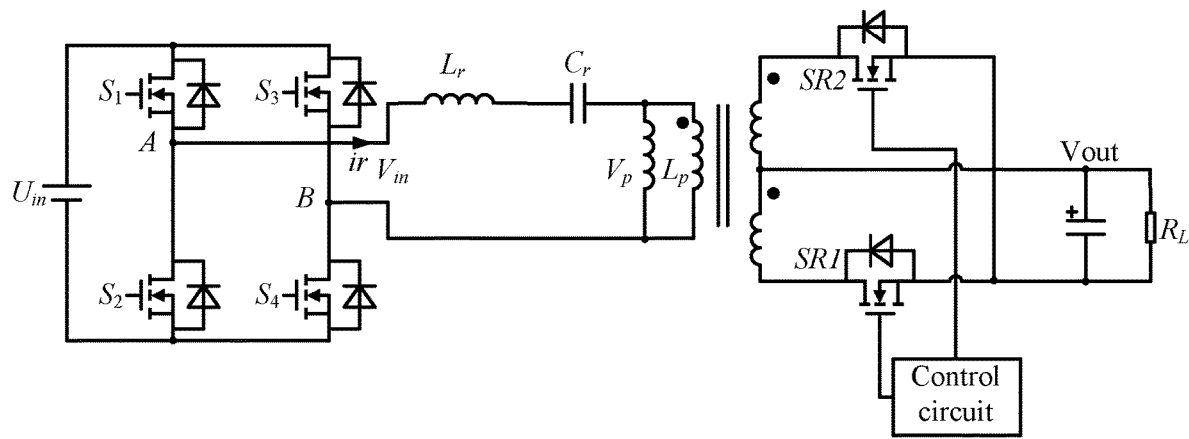
FIG. 1 is a schematic block diagram of a first example resonant converter with a control circuit, in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Resonant converters such as LLC resonant converters are widely used due to their relatively small switching losses. The secondary side of the LLC resonant converter adopts a synchronous rectification scheme, and when the drain-source voltage of the synchronous rectification switch reaches a conduction threshold, the synchronous rectification switch is turned on. However, when the LLC resonant converter is switched from a continuous conduction mode (CCM) to a discontinuous conduction mode (DCM), the synchronous rectification switch can be turned on by misoperation caused by the oscillation of the drain-source voltage being increased to the conduction threshold. The synchronous rectification switch may also be turned on by misoperation caused by the oscillation of an capacitive current spike when the LLC resonant converter operates at light load. Since no energy is transferred from the primary side to the secondary side of the LLC resonant converter, such misoperation of the synchronous rectification switch needs to be shielded, in order to avoid a negative current to be fed back from the output terminal to the input terminal of the LLC resonant converter.

One approach to solving the above-mentioned misoperation of the synchronous rectification switch is that when a time length that the drain-source voltage of the synchronous rectification switch is greater than the conduction threshold reaches a preset time, synchronous rectification switch can be turned on. However, there are two problems with this approach. First, in order to effectively avoid the misoperation of the synchronous rectification switch, the preset time needs to be longer, which will cause a long delay time for turning on the synchronous rectification switch, thereby reducing the efficiency of the secondary side synchronous rectification. The second is that the preset time cannot be adjusted dynamically, and may not be fully applicable to all operating conditions, which may not solve the problem of the misoperation of the synchronous rectification switch at certain applications.

Referring now to FIG. 1, shown is a schematic block diagram of a first example resonant converter with a control circuit, in accordance with embodiments of the present invention. This example resonant converter configured as a full-bridge LLC resonant converter can include a switching circuit, an LLC resonant network, a transformer, and a rectification circuit. The switching circuit can include two bridge arms, one bridge arm can include a pair of power switches $S_1$ and $S_2$, and the other bridge arm can include a pair of power switches $S_3$ and $S_4$. The LLC resonant network can include resonant inductance Lr, resonant capacitor Cr, and magnetizing inductance Lp of the transformer coupled in series between a first node and a second node. Here the "first node" is configured as a common terminal of power switches $S_1$ and $S_2$, and the "second node" is configured as a common terminal of power switches $S_3$ and $S_4$. The LLC resonant converter can receive input voltage Uin. The transformer can isolates the switching circuit and the LLC resonant network from the rectification circuit by a primary side winding and two series secondary side windings ns1 and ns2 coupled in series.

The rectification circuit with a center-taped structure can include a pair of synchronous rectification switches SR1 and SR2 connected to an output capacitor. First terminals of synchronous rectification switches SR1 and SR2 can connect to a ground reference. A second terminal of synchronous rectification switch SR1 can connect to one terminal of secondary side winding ns1, and a second terminal of synchronous rectification switch SR2 can connect to one terminal of secondary side winding ns2. The control circuit can be coupled to control terminals of synchronous rectification switches SR1 and SR2, and control the switching states of synchronous rectification switches SR1 and SR2. In this example, synchronous rectification switches SR1 and SR2 are both metal-oxide-semiconductor (MOS) switches. It should be understood that synchronous rectification switches SR1 and SR2 may be P-type or N-type MOS. It should be understood that the resonant converter is the LLC resonant converter as an example, other types of the resonant converter can be applied in the embodiments, such as LC or CCL resonant converter. Also, the topology of the resonant can be the half-bridge resonant converter or any other suitable topology.

Figure 2:
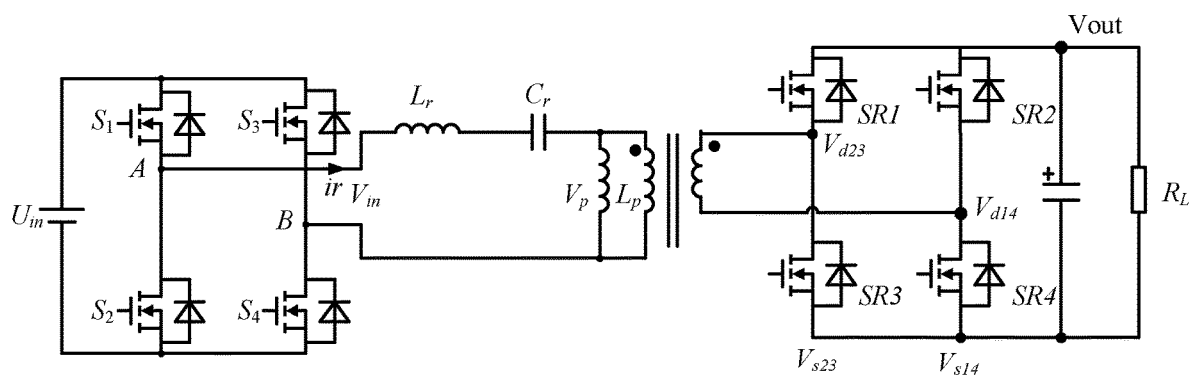
FIG. 2 is a schematic block diagram of a second example resonant converter with a control circuit, in accordance with embodiments of the present invention.

Referring now to FIG. 2, shown is a schematic block diagram of a second example resonant converter with a control circuit, in accordance with embodiments of the present invention. The transformer can isolate the switching circuit and the LLC resonant network from the rectification circuit by a primary side winding and a secondary side winding. The rectification circuit with a full-bridge structure can include two pairs of synchronous rectification switches.

Figure 3:
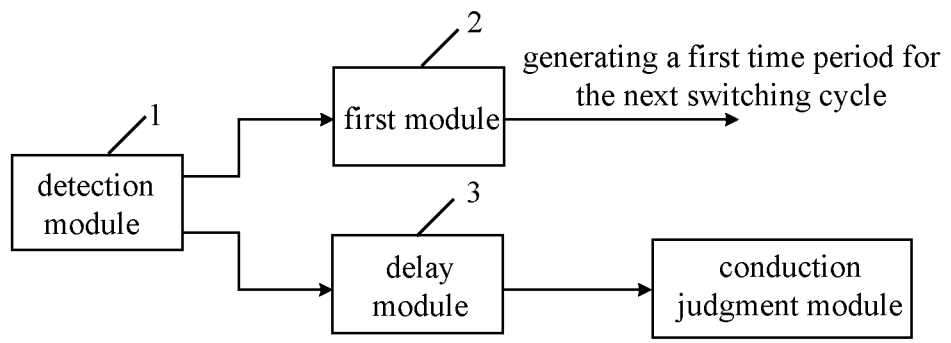
FIG. 3 is a schematic block diagram of an example control circuit, in accordance with embodiments of the present invention.

Referring now to FIG. 3, shown is a schematic block diagram of an example control circuit, in accordance with embodiments of the present invention. This example control circuit can include voltage detection module 1, first module 2 and delay module 3. As used herein, a "module" can include hardware circuitry. Voltage detection module 1 can detect a drain-source voltage of the synchronous rectification switch. In one switching cycle, delay module 3 can delay a first time period from a first moment, and the synchronous rectification switch is turned on when voltage detection module 1 detects that the drain-source voltage of the synchronous rectification switch reaches a first threshold after the first time period. Here, the "first threshold" can be a conduction threshold of the synchronous rectification switch. This can avoid the problem of the oscillation of the drain-source voltage caused by factors such as operating in the DCM and capacitive current spikes at light load condition, and can filter out the high-frequency oscillation of the drain-source voltage caused by the parasitic parameters of the LLC resonant network. Here, the "first time period" can be generated according to the operating state of the synchronous rectification switch in the previous switching cycle. Further, first module 2 can generate the first time period of the next switching cycle in the current switching cycle. In addition, the first time period can be generated based on the drain-source voltage of the synchronous rectification switch in the previous switching cycle. In one example, first module 2 can detect an amplitude and a time length of the oscillation of the drain-source voltage, and generate the first time period that represents a delay time for turning on the synchronous rectification switch in the next switching cycle.

In addition, the "first moment" may be optional in different applications. In one example, the first moment may be a moment when the drain-source voltage of the synchronous rectification switch begins to drop for the first time in the current switching cycle. In one embodiment, the first moment may be a moment when the drain-source voltage of the synchronous rectification switch decreases to the first threshold for the first time. In one embodiment, the first moment may be a moment when the drain-source voltage of the synchronous rectification switch decreases to zero for the first time.

In one example, the first time period may be in proportional with a time period that the drain-source voltage is greater than a second threshold during the on-state of the synchronous rectification switch. Here, the second threshold can be greater than the first threshold. Further, the first time period may be in proportional with the number and the length of a first interval during the conduction process of the synchronous rectification switch. Here, the first interval can be an interval where the drain-source voltage of the synchronous rectification is continuously greater than the second threshold, and a time length that the drain-source voltage is continuously greater than the second threshold is greater than a second time period. In one example, the conduction process of the synchronous rectification switch can include an interval from the first moment to a second moment. The "second moment" is a moment when the synchronous rectification switch is turned on properly. For example, the second moment is a moment that the conduction time of the synchronous rectification switch reaches a preset time.

In particular embodiments, a synchronous rectification driving method is adopted for the resonant converter, where the synchronous rectification switch is turned on when the voltage detection module detects that the drain-source voltage reaches the first threshold after the first time period. Here, the first time period can be generated based on the operating state of the synchronous rectification switch in the previous switching cycle. The control circuit can control the switching state of the synchronous rectification switch in the current switching cycle while generating the first time period that represents a delay time of turning on the synchronous rectification switch in the next switching cycle. Since the first time period is generated based on the operating state of the synchronous rectification switch in the previous switching cycle, the delay time of turning on the synchronous rectification switch can be dynamically adjusted for different operating states, so as to reliably prevent the synchronous rectification switch from tuning on by misoperation caused by the oscillation of the drain-source voltage. This approach can reduce the delay time as much as possible, improve the efficiency of the secondary side synchronous rectification, and may ensure that the synchronization rectification switch can operate reliably under light load and DCM. In this example, the oscillation of the drain-source voltage may be caused by the capacitive current spikes and operating in DCM.

In one example, the control circuit can further include a conduction judgment module. After the synchronous rectification switch is turned on, if a first interval does not exist within a preset time, it can be determined that the synchronous rectification switch is turned on correctly; otherwise, the synchronous rectification switch may be turned on by misoperation (e.g., incorrectly, by mistake). For example, after the synchronous rectification switch is turned on, if the drain-source voltage of the synchronous rectification switch reaches a second threshold within the preset time, and a time length that the drain-source voltage is greater than the second threshold reaches the second time period, this may indicate that the synchronous rectification switch is turned on by misoperation, thereby turning off the synchronous rectification switch. The double judgment of the drain-source voltage of the synchronous rectification switch can filter out the natural oscillation caused by the parasitic parameters of the LLC resonant converter.

Further, in the current switching cycle, if it is determined that the synchronous rectification switch is turned on by misoperation, the synchronous rectification switch needs to turn on again. In this way, whether the synchronous rectification switch is turned on by misoperation needs to be determined after the synchronous rectification switch is turned on each time, until the synchronous rectification switch is turned on properly. In order to prevent the synchronous rectification switch from repeatedly turning on by misoperation, the conditions for turning on the synchronous rectification switch again may be set strictly. In one example, when the drain-source voltage of the synchronous rectification switch reaches the first threshold, the synchronous rectification switch is turned on again. In another example, when a time length that the drain-source voltage of the synchronous rectification switch is continuously less than the first threshold reaches a third time period, the synchronous rectification switch is turned on again. Here, the third time period may be set according to the actual applications.

In one example, first module 2 can include first and second timers. The first timer starts timing at the first moment, and stops timing at the second moment. The second timer also starts timing at the first moment, and when a time length that the drain-source voltage of the synchronous rectification switch is continuously greater than the second threshold reaches the second time period, the second timer may be cleared. When the drain-source voltage of the synchronous rectification switch is less than zero or the first threshold, the second timer restarts timing, and stops timing at the second moment. Further, the timing difference between the first timer and the second timer in the current switching cycle can be configured as the first time period of the next switching cycle. The second moment is a moment when the synchronous rectification switch is turned on properly. For example, the second moment is a moment that the conduction time of the synchronous rectification switch reaches a preset time. It should be noted that the control circuit of certain embodiments also controls the synchronous rectification switch to turn off. For example, after the synchronous rectification switch is turned on properly, when the drain-source voltage of the synchronous rectification switch reaches a shut-off voltage, the synchronous rectification switch can be turned off.

Figure 4:
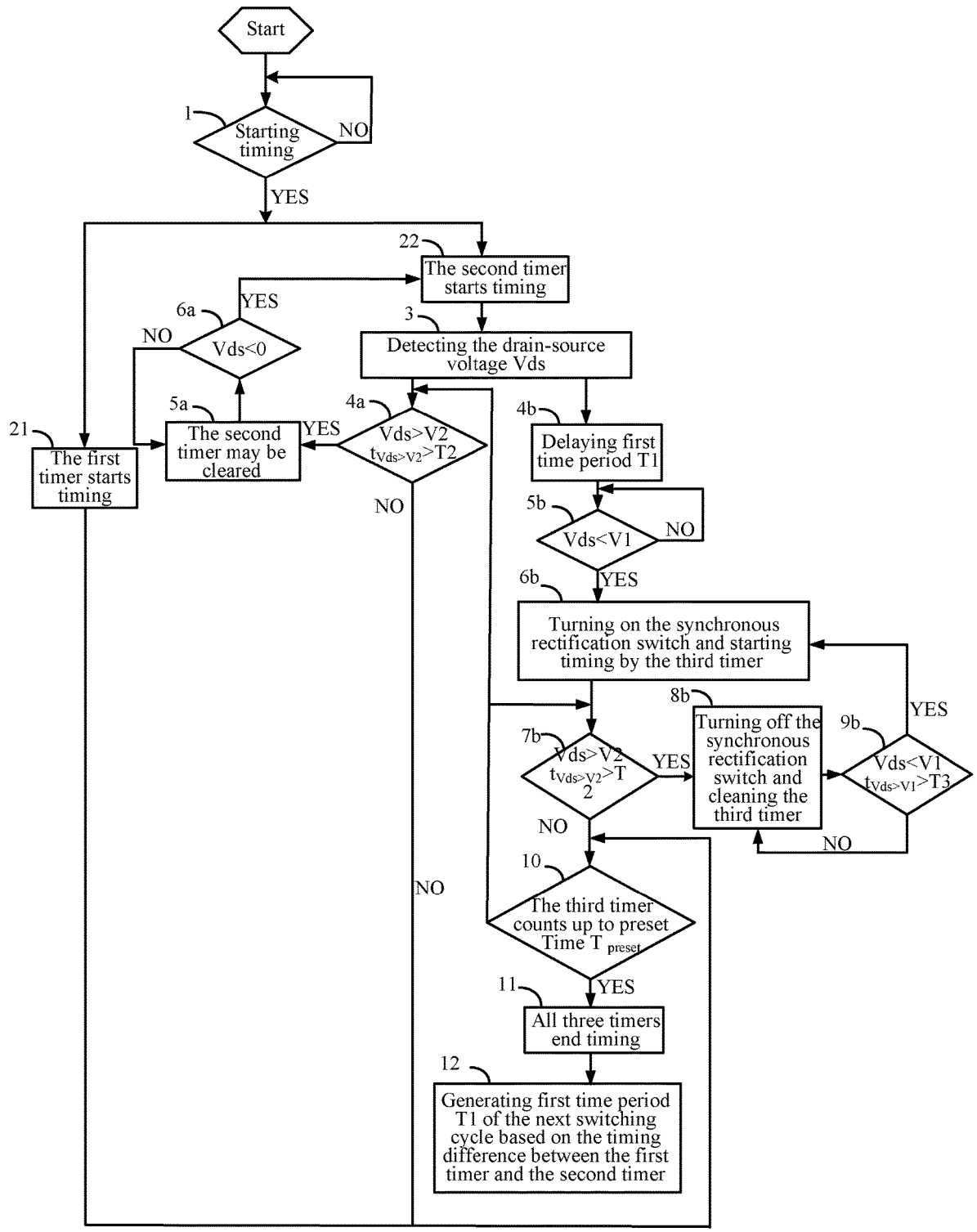
FIG. 4 is a flow diagram of an example control method of a synchronous rectification switch, in accordance with embodiments of the present invention.

Referring now to FIG. 4, shown is a flow diagram of an example control method of a synchronous rectification switch, in accordance with embodiments of the present invention. This example control method may be applied in the resonant converter, and can include two aspects. The first aspect is to control the conduction of the synchronous rectification switch, and the second aspect is to generate the first time period of the next switching cycle. First, in step 1, it can be determined whether or not the timing has started; that is, whether or not the first moment is reached. If so, then steps 21 and 22 come into play. In step 21, the first timer starts timing. In step 22, the second timer starts timing. Otherwise, step 1 may be executed again. Here, the first moment may be optional in different applications. In one example, the first moment may be a moment when the drain-source voltage of the synchronous rectification switch begins to drop for the first time in the current switching cycle. In one embodiment, the first moment may be a moment when the drain-source voltage of the synchronous rectification switch decreases to the first threshold for the first time. In one embodiment, the first moment may be a moment when the drain-source voltage of the synchronous rectification switch decreases to zero for the first time.

In step 3, the drain-source voltage of the synchronous rectification switch can be detected. In step 4a, it can be determined whether or not the first interval exists, that is, it can be determined whether or not a time length that drain-source voltage of the synchronous rectification switch Vds is continuously greater than threshold V2 is greater than time period T2. If so, then in step 5a, the second timer may be cleared. Otherwise, in step 10, whether the third timer counts up to preset time $T_{preset}$ can be determined. In step 6a, it can be determined whether or not drain-source voltage Vds is less than zero, or it may be determined whether or not drain-source voltage Vds is less than threshold V1. If so, then in step 22, the second timer starts timing. Otherwise, step 5a may be executed again. In step 4b, first time period T1 can be delayed from the first moment.

In step 5b, it can be determined whether or not drain-source voltage Vds reaches the conduction threshold; that is, it can be determined whether or not drain-source voltage Vds is less than threshold V1. If so, then in step 6b, the synchronous rectification switch can be turned on, and the third timer starts timing. Otherwise, step 5b may be executed again. In step 7b, it can be determined whether or not the first interval exists, that is, it can be determined whether or not a time length that drain-source voltage of the synchronous rectification switch Vds is greater than threshold V2 is greater than time period T2. If so, then in step 8b, the synchronous rectification switch can be turned off, and the third timer can be cleared. Otherwise, step 10 may be executed.

In step 9b, it can be determined whether or not a time length that drain-source voltage of the synchronous rectification switch Vds is less than threshold V1 is greater than time period T3. If so, then step 6b may be executed again. Otherwise, step 8b may be executed again. In step 10, it can be determined whether or not the third timer counts up to preset time $T_{preset}$. If so, then in step 11, All three timers end timing. Otherwise, steps 4a and 7b may be executed again. In step 12, first time period T1 of the next switching cycle can be generated based on the timing difference between the first timer and the second timer. In the above process, steps 4a, 5a, and 6a are the timing steps of the second timer to generate the first time of the next switching cycle, steps 4b, 5b, 6b, 7b, 8b, and 9b are to control the conduction of the synchronous rectification switch in current switching cycle, and steps 4a and step 4b start at the same time.

The process of conducting the synchronous rectification switch in FIG. 4 can be as described below. After the first time period is delayed from the first moment, when the drain-source voltage of the synchronous rectification switch reaches the first threshold, the synchronous rectification switch can be turned on. Here, the first time period may be generated based on the operating state of the synchronous rectification switch at the previous switching cycle. After the synchronous rectification switch is turned on, if the first interval does not exist within the preset time, it is determined that the synchronous rectification switch is turned on properly; otherwise, the synchronous rectification switch is turned on by misoperation.

The first interval is an interval where the drain-source voltage is greater than the second threshold, and the time length during which the drain-source voltage is greater than the second threshold is greater than the second time period, and the second threshold is greater than the first threshold. Preset time $T_{preset}$ in FIG. 4 is a period of time after the synchronous rectification switch is turned on. The third timer can count for preset time $T_{preset}$, and the starting point of the third timer is a moment when the synchronous rectification switch is turned on. When the drain-source voltage is greater than the second threshold, and the time length during which the drain-source voltage is greater than the second threshold is greater than the second time period, the third timer can be cleared. When the timing of the third timer reaches the preset time, the third timer may end.

After the synchronous rectification switch is turned on, if the drain-source voltage of the synchronous rectification switch reaches the second threshold within the preset time, and a time length that the drain-source voltage is greater than the second threshold reaches the second time period within the preset time, this may indicate that the synchronous rectification switch is turned on by misoperation, thereby turning off the synchronous rectification switch. The double judgment of the drain-source voltage of the synchronous rectification switch can filter out the natural oscillation caused by the parasitic parameters of the LLC resonant converter. Further, in the current switching cycle, if it is determined that the synchronous rectification switch is turned on by misoperation, the synchronous rectification switch needs to turn on again. In this way, whether the synchronous rectification switch is turned on by misoperation needs to be determined after the synchronous rectification switch is turned on each time, until it is determined that the synchronous rectification switch is turned on properly.

In order to prevent the synchronous rectification switch from repeatedly turning on by mistake, the conditions for turning on the synchronous rectification switch may be set strictly. In one example, when the drain-source voltage of the synchronous rectification switch reaches the first threshold, the synchronous rectification switch can be turned on again. In another example, when a time length that the drain-source voltage of the synchronous rectification switch is continuously less than the first threshold reaches a third time period, the synchronous rectification switch is turned on again. Here, the third time period may be set according to particular applications.

In one example, first module 2 can include first and second timers. The first timer starts timing at the first moment, and stops timing at the second moment. The second timer also starts timing at the first moment, and when a time length that the drain-source voltage of the synchronous rectification switch is greater than the second threshold reaches the second time period, the second timer may be cleared. When the drain-source voltage of the synchronous rectification switch decreases is less than zero or the first threshold, the second timer restarts timing, and stops timing at the second moment. Further, the timing difference between the first timer and the second timer in the current switching cycle can be configured as the first time period of the next switching cycle.

The second moment is a moment when the conduction time of the synchronous rectification switch reaches preset time $T_{preset}$. Preset time $T_{preset}$ is a period of time after the synchronous rectification switch is turned on. The third timer can be applied to count for the preset time. The starting point of the third timer is a moment when the synchronous rectification switch is turned on. When drain-source voltage Vds is greater than threshold V2, and time length $t_{Vds>V2}$ that drain-source voltage Vds is greater than second threshold is greater than time period T2, the third timer can be cleared. When the timing of the third timer reaches the preset time, the third timer ends.

Figure 5A:
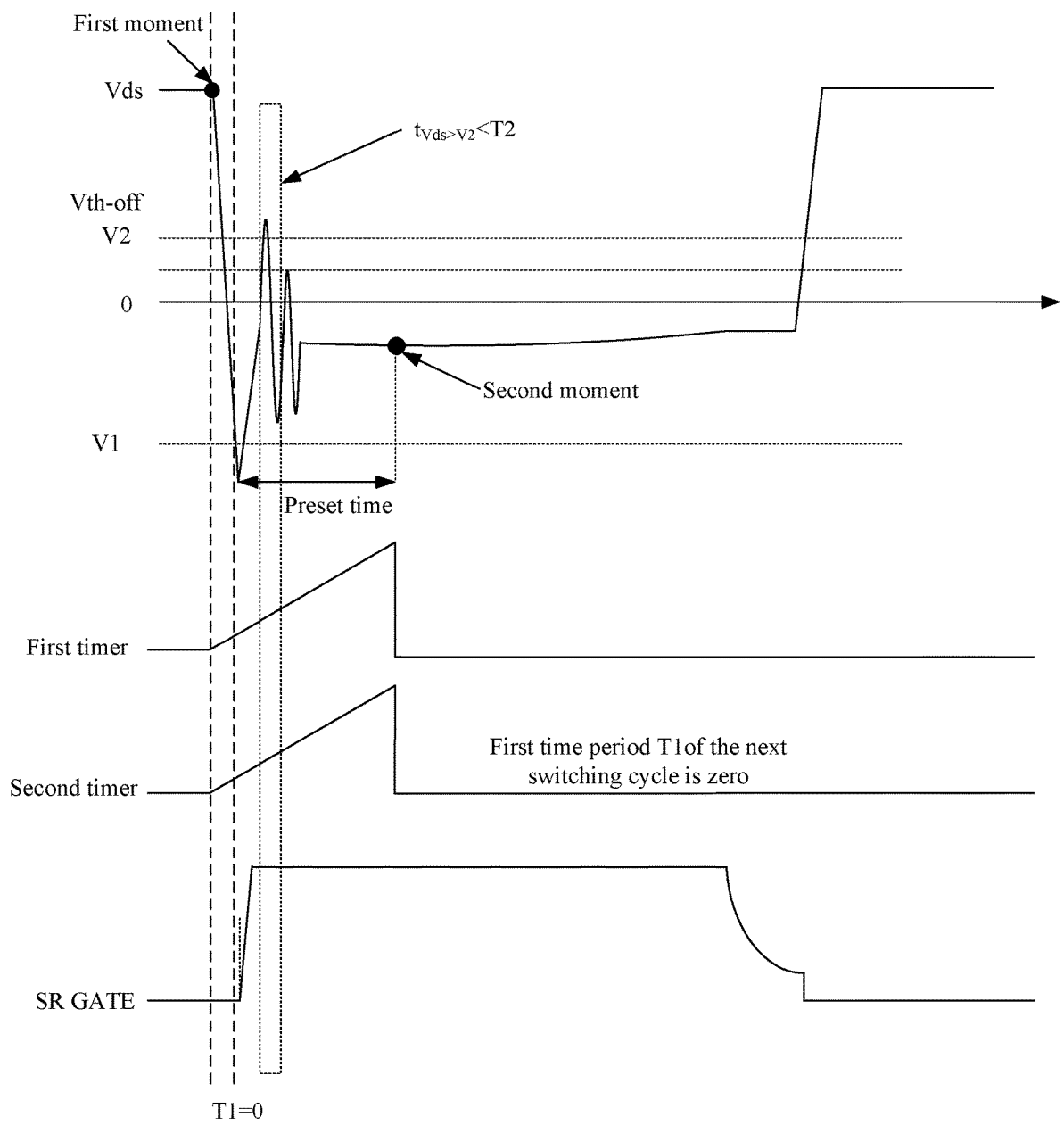
FIGS. 5A-5D are waveform diagrams of example operation of a control circuit from the CCM to the DCM, in accordance with embodiments of the present invention.

Referring now to FIGS. 5A-5D, shown are waveform diagrams of example operation of a control circuit from the CCM to the DCM, in accordance with embodiments of the present invention. Here, the first moment may be a moment when the drain-source voltage of the synchronous rectification switch begins to drop for the first time in the current switching cycle. In FIG. 5A, the LLC resonant converter operates in the CCM. The first and second timers may start timing from the first moment. To facilitate describe, first time T1 of the current switching cycle calculated in the previous switching cycle is zero. When drain-source Vds reaches threshold V1 from the first moment, an effective control signal SR_GATE can be generated to turn on the synchronous rectification switch. After the synchronous rectification switch is turned on in FIG. 5A, the first interval within the preset time does not exist, such that the synchronous rectification switch is turned on correctly (e.g., officially, completely). The first interval is an interval in which drain-source voltage Vds is greater than threshold V2, and the time period during which drain-source voltage Vds is greater than the second threshold is greater than time period T2.

The first and second timers end timing at the second moment, and the second moment is a moment when the conduction time of the synchronous rectification switch reaches preset time $T_{preset}$. At the second moment, the timing difference between the first and second timers is zero, such that the first time period of the next switching cycle is zero. In FIG. 5A, the oscillation of the drain-source voltage may exceed the second threshold, but the time length that the drain-source voltage exceed the second threshold is less than the second time period, such that the second timer does not need to be cleared. Further, the oscillation in this example may be caused by the parasitic parameters of the resonant converter, which may not affect the resonant converter, and as such can be ignored here.

Figure 5B:
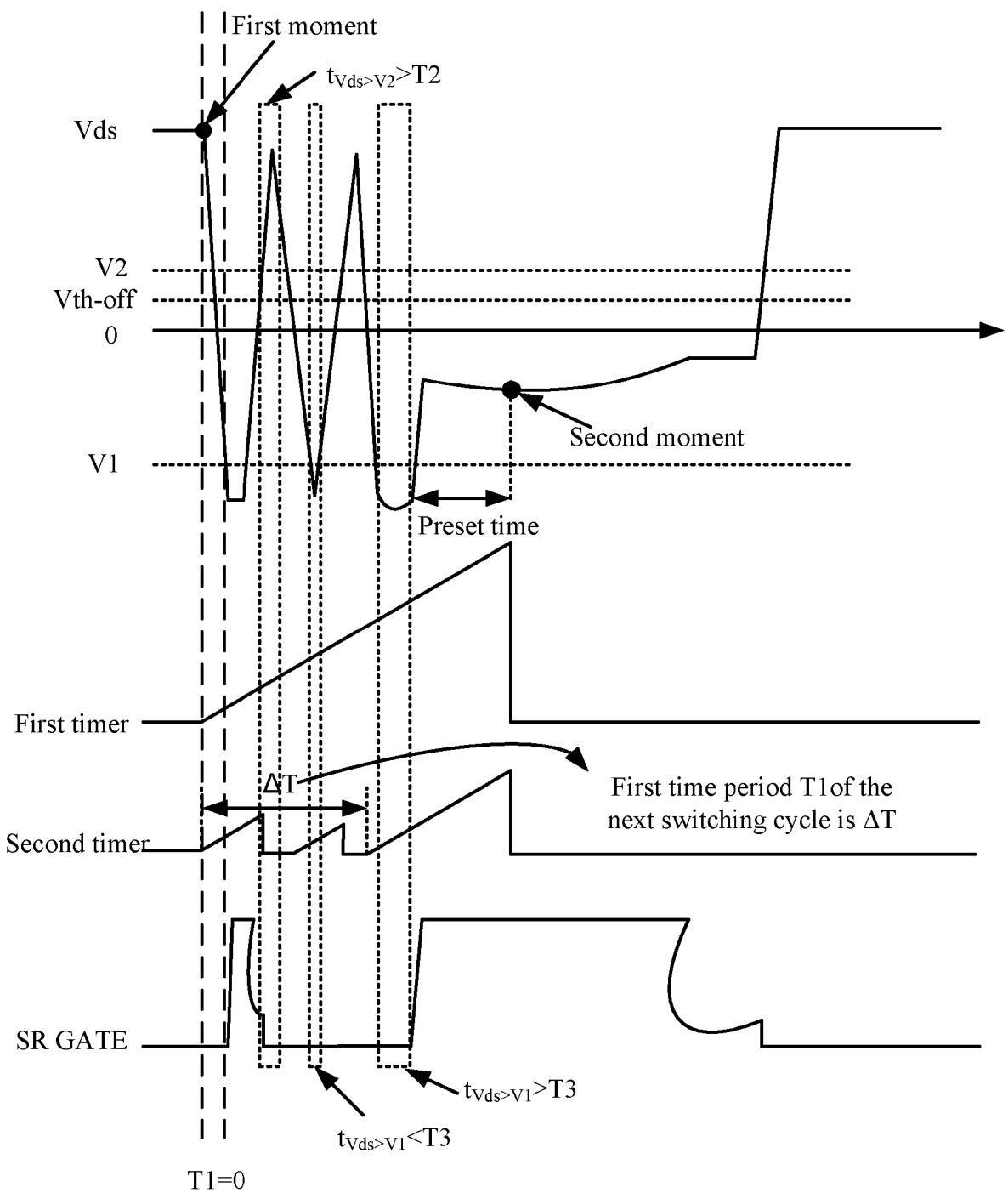

In FIG. 5B, the LLC resonant converter switches to the DCM from the CCM, and the first and second timers start timing from the first moment. First time T1 of the current switching cycle calculated in the previous switching cycle is zero. When drain-source voltage Vds reaches threshold V1 from the first moment, an effective control signal SR_GATE can be generated to turn on the synchronous rectification switch. After the synchronous rectifier is turned on in FIG. 5B, drain-source voltage Vds reaches threshold V2 within preset time $T_{preset}$. When the time length that drain-source voltage Vds reaches threshold V2 reaches time period T2, it can be determined that the synchronous rectification switch is turned on by mistake, an invalid control signal SR_GATE is generated to turn off the synchronous rectification switch, and the second timer may be cleared. When drain-source voltage Vds is less than 0, the second timer starts timing again.

When drain-source voltage Vds is less than threshold V1, and the time length that drain-source voltage Vds is less than threshold V1 is greater than time period T3, an effective control signal SR_GATE is generated to turn on the synchronous rectification switch again. After the synchronous rectification switch is turned on again, the first interval does not exist within preset time $T_{preset}$, and the synchronous rectification switch is turned on completely. In order to prevent the synchronous rectification switch from repeatedly turning on by mistake, the conditions for turning on the synchronous rectification switch again may be set strictly. In this example, when the time length that drain-source voltage Vds is greater than the first threshold reaches time period T3, the synchronous rectification switch is turned on again. Here, the third time period may be set according to the actual applications. The first and second timers end timing at the second moment, and at the second moment the timing difference between the first and second timers is ΔT; that is, the first time period of the next switching cycle is ΔT.

Figure 5C:
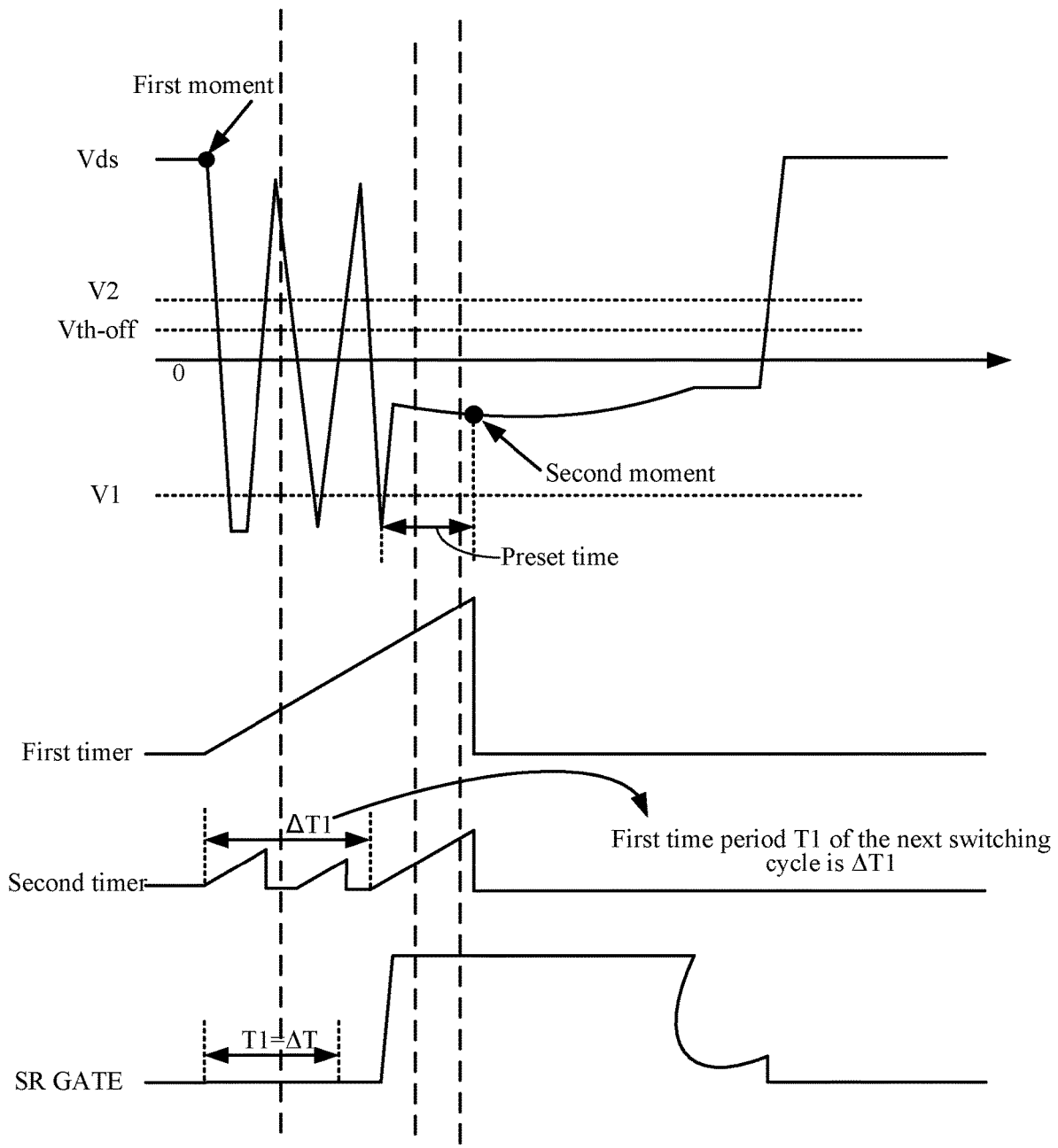

In FIG. 5C, the LLC resonant converter operates in the DCM, and the first and second timers start timing from the first moment. First time period ΔT can be delayed from the first moment, and when drain-source voltage Vds reaches threshold V1 after first time period ΔT, an effective control signal SR_GATE can be generated to turn on the synchronous rectification switch. After the synchronous rectifier is turned on in FIG. 5C, the first interval within the preset time does not exist, the synchronous rectification switch is turned on correctly (e.g., officially, completely). The first and second timers end at the second moment. At the second moment, the timing difference between the first and second timers is ΔT1, that is, the first time period of the next switching cycle is ΔT1.

Figure 5D:
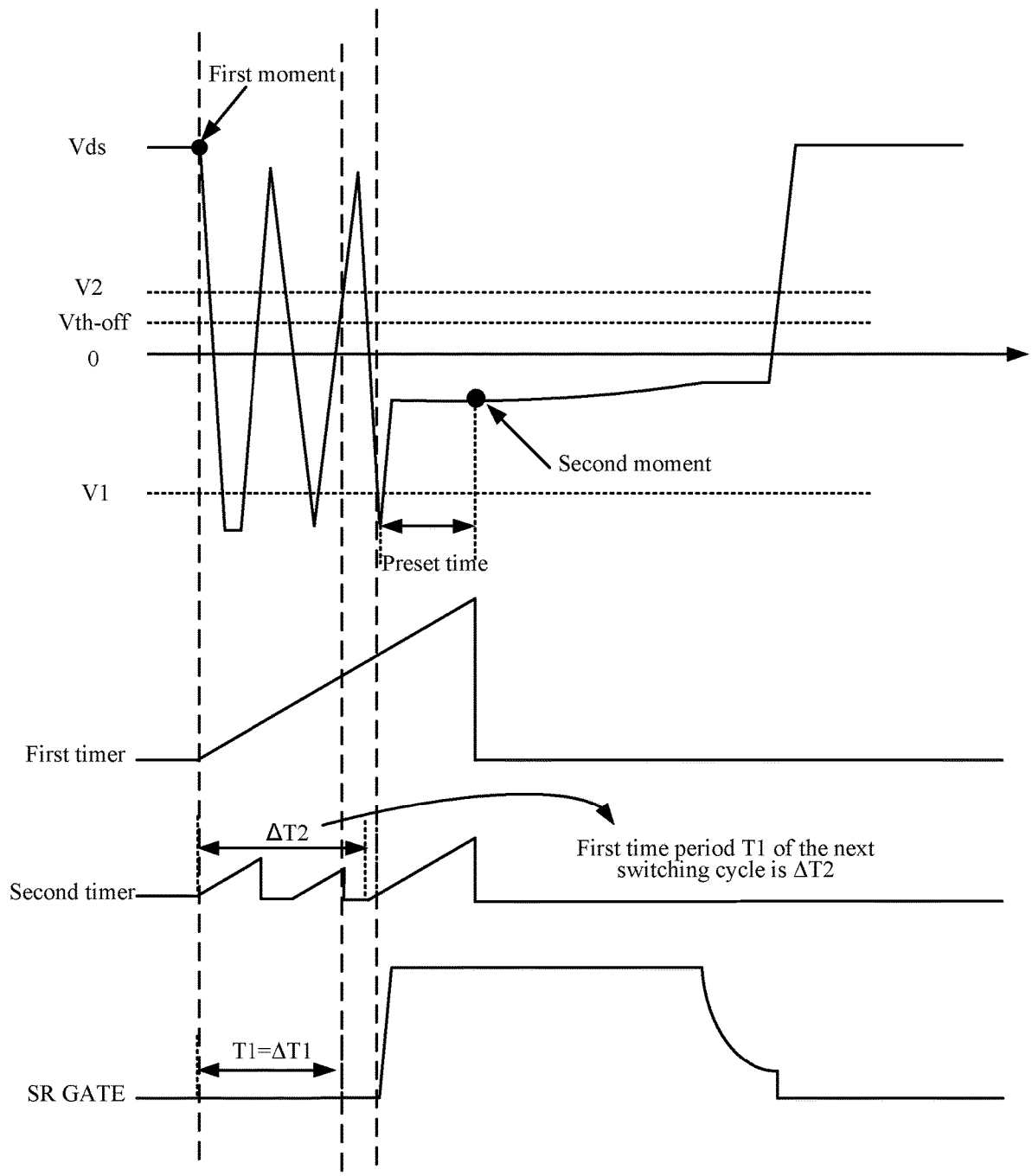

In FIG. 5D, the LLC resonant converter operates in the DCM, which is similar to the operation in FIG. 5C, and the first and second timers start timing from the first moment. First time period ΔT1 can be delayed from the first moment, and when drain-source voltage Vds reaches threshold V1 after first time period ΔT1, an effective control signal SR_GATE can be generated to turn on the synchronous rectification switch. After the synchronous rectifier is turned on in FIG. 5D, the first interval within the preset time does not exist, the synchronous rectification switch is turned on correctly (e.g., officially, completely). The first and second timers end timing at the second moment. At the second moment, the timing difference between the first and second timers is ΔT2; that is, the first time period of the next switching cycle is ΔT2.

It should be noted that the second timer counts between the first and the second time periods, which is only related to the drain-source voltage, and has nothing to do with the operation process of the synchronous rectification switch. As shown in FIGS. 5C and 5D, although the first time period is delayed from the first moment, the second timer still operates to time based on the drain-source voltage, and when the time length that the drain-source voltage is greater than the second threshold reaches the second time period, the second timer may be cleared, and when the drain-source voltage of the synchronous rectification switch is less than zero or less than the first threshold, the second timer is constantly reset and re-timed.

In FIGS. 5A-5D, the resonant converter of the present invention is switched from the CCM to the DCM, and the operating waveform diagram of the control circuit from heavy load to light load may be similar to that discussed herein. It should be understood that particular embodiments not only aimed at the drain-source voltage oscillation caused by the factors such as the resonant converter switching from CCM to DCM and from heavy load to light load, but also can solve the problem of drain-source voltage oscillation caused by other situations.

Particular embodiments provide a control method for driving a synchronous rectification switch of the resonant converter. This example control method is supposed to be applied in the resonant converter, and can include two aspect. The first aspect is to control the conduction of the synchronous rectification switch, and the second aspect is to generate the first time period of the next switching cycle.

In a switching cycle, a first time period is delayed from a first moment, and when a drain-source voltage of the synchronous rectification switch reaches a first threshold after the first time period, the synchronous rectification switch is controlled to be turned on, and the first time period is generated based on an operating state of the synchronous rectification switch in a previous switching cycle. The first moment may be optional in different applications. In one example, the first moment may be a moment when the drain-source voltage of the synchronous rectification switch begins to drop for the first time in the current switching cycle. In one embodiment, the first moment may be a moment when the drain-source voltage of the synchronous rectification switch decreases to the first threshold for the first time. In one embodiment, the first moment may be a moment when the drain-source voltage of the synchronous rectification switch decreases to zero for the first time.

In one example, the first time period is generated based on the drain-source voltage of the synchronous rectification switch in the previous switching cycle. Further, the first time period is in proportional with a time length during which the drain-source voltage is greater than a second threshold during the conduction progress of the synchronous rectification switch, and the second threshold is greater than the first threshold.

In one example, the first time period is in proportional with a number and a time length of a first interval, the first interval is configured as an interval where a time length that the drain-source voltage is greater than a second threshold is greater than a second time period, the second threshold is greater than the first threshold. After the synchronous rectification switch is turned on, whether a first interval exists within a preset time is determined, in order to determine whether the synchronous rectification switch is turned on by misoperation, wherein the preset time is greater than the second time period.

For example, after the synchronous rectification switch is turned on, if the drain-source voltage of the synchronous rectification switch reaches the second threshold within the preset time, and a time length that the drain-source voltage is greater than the second threshold reaches the second time period within the preset time, this may indicate that the synchronous rectification switch is turned on by misoperation, thereby turning off the synchronous rectification switch. Further, in the current switching cycle, if it is determined that the synchronous rectification switch is turned on by misoperation, the synchronous rectification switch needs to be turned on again. In this way, whether the synchronous rectification switch is turned on by misoperation needs to be determined after the synchronous rectification switch is turned on each time, until the synchronous rectification switch is turned on properly.

In order to prevent the synchronous rectification switch from repeatedly turning on by misoperation, the conditions for turning on the synchronous rectification switch again may be set strictly. In one example, when the drain-source voltage of the synchronous rectification switch reaches the first threshold, the synchronous rectification switch is turned on again. In another example, when a time length that the drain-source voltage of the synchronous rectification switch is less than the first threshold reaches a third time period, the synchronous rectification switch is turned on again. Here, the third time period may be set according to the actual applications.

In one example, first and second timers can be applied to this control method. The first timer starts timing at the first moment, and stops timing at the second moment. The second timer also starts timing at the first moment, and when a time length that the drain-source voltage of the synchronous rectification switch is greater than the second threshold reaches the second time period, the second timer may be cleared. When the drain-source voltage of the synchronous rectification switch is less than zero or the first threshold, the second timer restarts timing, and stops timing at the second moment. Further, the timing difference between the first timer and the second timer in the current switching cycle can be configured as the first time period of the next switching cycle. The second moment is a moment when the synchronous rectification switch is turned on properly. For example, the second moment is a moment that the conduction time of the synchronous rectification switch reaches a preset time.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A control circuit for controlling a synchronous rectification switch of a resonant converter, wherein in a switching cycle, the control circuit is configured to:
   a) delay a first time period from a first moment;
   b) control the synchronous rectification switch to be turned on when a drain-source voltage of the synchronous rectification switch reaches a first threshold after the first time period;
   c) wherein the first time period is generated based on an operating state of the synchronous rectification switch in a previous switching cycle, and is in positive correlation with a time length during which the drain-source voltage is greater than a second threshold during a conduction process of the synchronous rectification switch, wherein the second threshold is greater than the first threshold; and
   d) wherein the first moment is configured as a moment when the drain-source voltage of the synchronous rectification switch begins to drop for a first time in the switching cycle, decreases to the first threshold for the first time, or decreases to zero for the first time.

2. The control circuit of claim 1, wherein the first time period is generated based on the drain-source voltage of the synchronous rectification switch in the previous switching cycle.

3. The control circuit of claim 1, wherein the first time period is proportional to a number and a time length of a first interval, and the first interval is configured as an interval where the time length during which the drain-source voltage is greater than the second threshold is greater than a second time period.

4. The control circuit of claim 1, wherein:
   a) after the synchronous rectification switch is turned on, whether a first interval exists within a preset time is determined, in order to determine whether the synchronous rectification switch is turned on by misoperation; and
   b) the first interval is configured as an interval where the time length that the drain-source voltage is greater than the second threshold is greater than a second time period.

5. The control circuit of claim 4, wherein when the synchronous rectification switch is turned on by misoperation, the synchronous rectification switch is controlled to be turned off, and the synchronous rectification switch is controlled to be turned on again when the drain-source voltage of the synchronous rectification switch is less than the first threshold.

6. The control circuit of claim 5, wherein when the synchronous rectification switch is turned on by misoperation, the synchronous rectification switch is controlled to be turned off, and the synchronous rectification switch is controlled to be turned on again when a time length that the drain-source voltage of the synchronous rectification switch is greater than the first threshold reaches a third time period.

7. The control circuit of claim 1, wherein the control circuit comprises:
   a) a first timer configured to time between the first moment and a second moment; and
   b) a second timer configured to time between the first moment and the second moment, wherein the second timer is cleared when the time length that the drain-source voltage of the synchronous rectification switch is greater than the second threshold reaches a second time period, and restarts timing when the drain-source voltage of the synchronous rectification switch decreases to be less than zero or the first threshold; and
   c) the timing difference between the first timer and the second timer in a current switching cycle is the first time period for a next switching cycle.

8. The control circuit of claim 7, wherein the second moment is configured to be a moment that reaches a preset time from a moment when the synchronous rectification switch is turned on.

9. A method of controlling a synchronous rectification switch of a resonant converter, the method comprising:
   a) delaying a first time period from a first moment;
   b) controlling the synchronous rectification switch to turn on when a drain-source voltage of the synchronous rectification switch reaches a first threshold after the first time period;
   c) wherein the first time period is generated based on an operating state of the synchronous rectification switch in a previous switching cycle, and is in positive correlation with a time length during which the drain-source voltage is greater than a second threshold during a conduction process of the synchronous rectification switch, wherein the second threshold is greater than the first threshold; and
   d) wherein the first moment is configured as a moment when the drain-source voltage of the synchronous rectification switch begins to drop for a first time in the switching cycle, decreases to the first threshold for the first time, or decreases to zero for the first time.

10. The method of claim 9, wherein the first time period is generated based on the drain-source voltage of the synchronous rectification switch in the previous switching cycle.

11. The method of claim 9, wherein the first time period is proportional to a number and a time length of a first interval, and the first interval is configured as an interval where the time length during which the drain-source voltage is greater than the second threshold is greater than a second time period.

12. The method of claim 9, wherein:
   a) after the synchronous rectification switch is turned on, whether a first interval exists within a preset time is determined, in order to determine whether the synchronous rectification switch is turned on by misoperation; and
   b) the first interval is configured as an interval where the time length that the drain-source voltage is greater than the second threshold is greater than a second time period.

13. The control method of claim 12, wherein if the synchronous rectification switch is turned on by misoperation, the synchronous rectification switch is controlled to be turned off, and the synchronous rectification switch is controlled to be turned on again when the drain-source voltage of the synchronous rectification switch is less than the first threshold.

14. The method of claim 13, wherein if the synchronous rectification switch is turned on by misoperation, the synchronous rectification switch is controlled to be turned off, and the synchronous rectification switch is controlled to be turned on again when a time length that the drain-source voltage of the synchronous rectification switch is greater than the first threshold reaches a third time period.

15. The method of claim 9, further comprising:
a) timing between the first moment and a second moment by a first timer;
b) timing between the first moment and the second moment by a second timer;
c) generating the first time period of a next switching cycle based on the timing difference between the first timer and the second timer in a current switching cycle; and
d) wherein the second timer is cleared when the time length that the drain-source voltage of the synchronous rectification switch is greater than the second threshold reaches a second time period and restarts timing when the drain-source voltage of the synchronous rectification switch decreases is less than zero or the first threshold.

16. The method of claim 9, wherein the second moment is configured to a moment that reaches a preset time from the a moment when the synchronous rectification switch is turned on.

\* \* \* \* \*